Nov. 8, 1960 T. TURNER 2,959,382
STABILIZING AND PROTECTIVE ATTACHMENT
FOR AIRCRAFT EJECTION SEATS
Filed Aug. 5, 1957 4 Sheets-Sheet 1

INVENTOR.
Thomas Turner
BY
ATTORNEY.

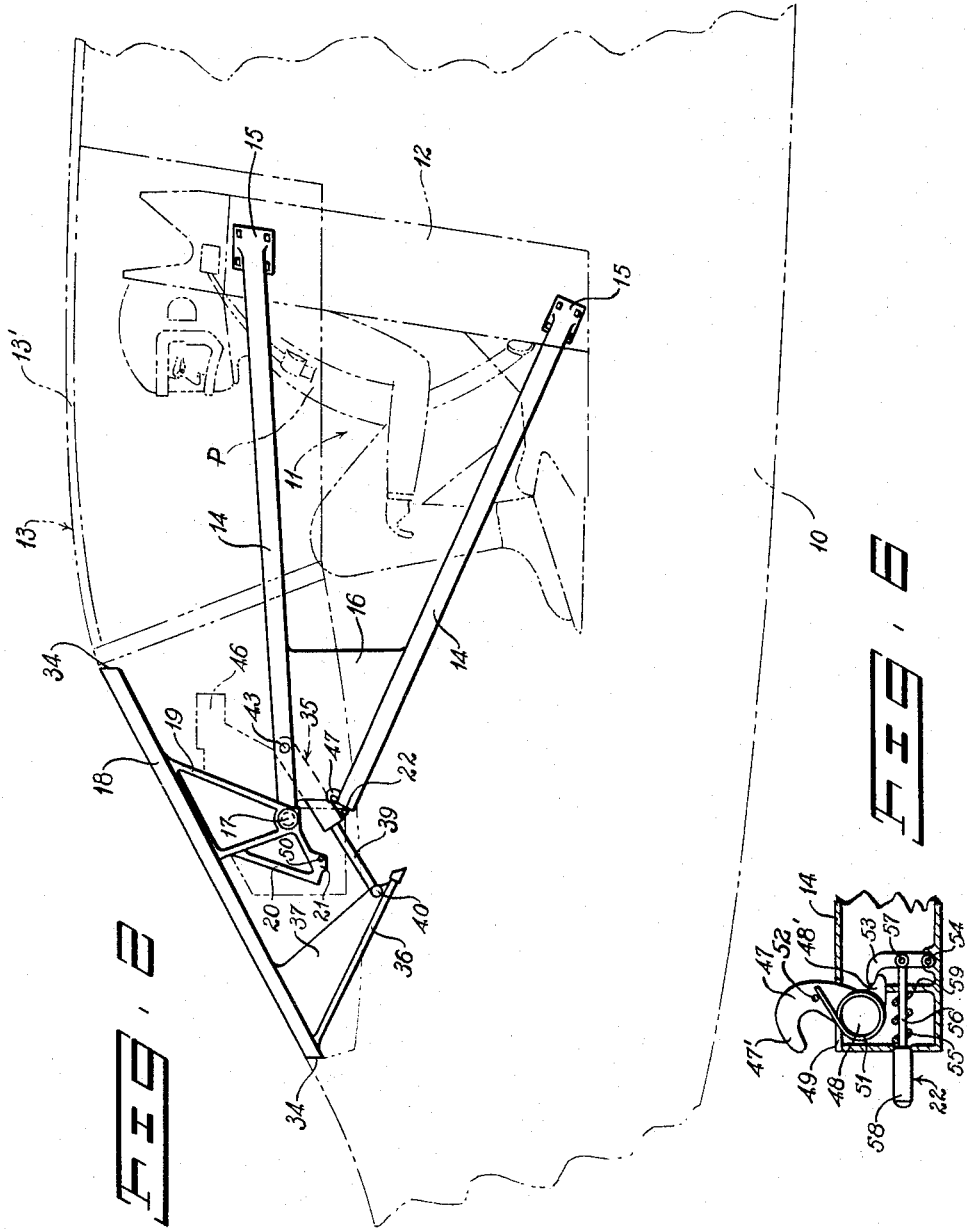

Nov. 8, 1960
T. TURNER
2,959,382
STABILIZING AND PROTECTIVE ATTACHMENT
FOR AIRCRAFT EJECTION SEATS
Filed Aug. 5, 1957
4 Sheets-Sheet 3
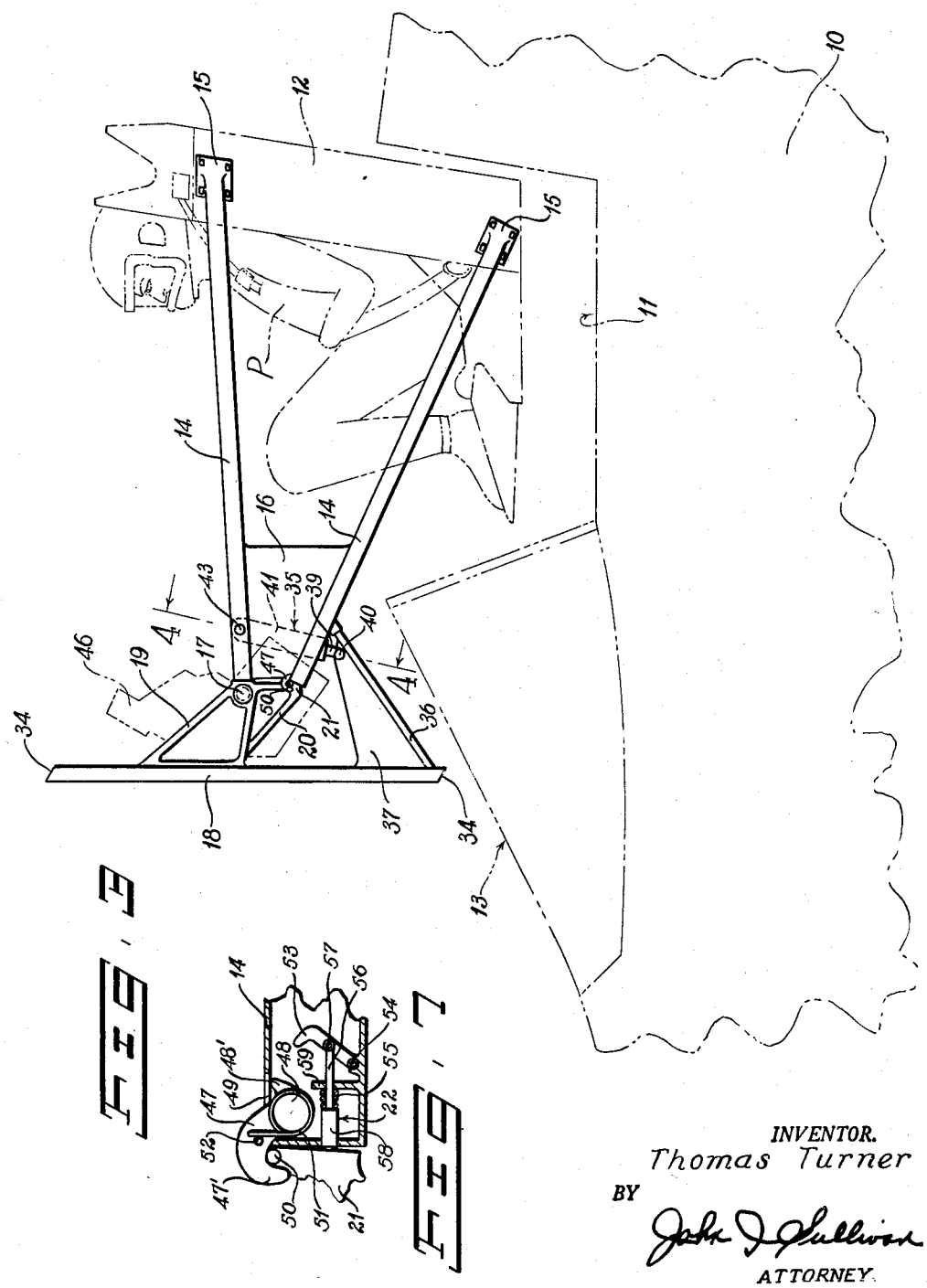
INVENTOR.
Thomas Turner
BY
ATTORNEY Nov. 8, 1960

T. TURNER 2,959,382

STABILIZING AND PROTECTIVE ATTACHMENT
FOR AIRCRAFT EJECTION SEATS

Filed Aug. 5, 1957

INVENTOR.
Thomas Turner

BY
John J. Sullivan
ATTORNEY.

United States Patent Office 2,959,382
Patented Nov. 8, 1960

2,959,382

STABILIZING AND PROTECTIVE ATTACHMENT FOR AIRCRAFT EJECTION SEATS

Thomas Turner, Forest Hills, N.Y., assignor to Republic Aviation Corporation, near Farmingdale, N.Y., a corporation of Delaware Filed Aug. 5, 1957, Ser. No. 676,186

18 Claims. (Cl. 244—122)

This invention relates broadly to escape systems from aircraft for the occupants thereof during flight and more particularly to a stabilizing and protective attachment connected to and carried by a conventional ejection seat for the conversion of such seat with its occupant at or upon ejection from the airplane in flight into an aerodynamically stable body.

The present invention contemplates, among other things, an attachment or auxiliary apparatus to be so connected to ejection seat that it functions as an integral part of the airplane during normal operation of said airplane and, in an emergency, may be operatively disengaged from the airplane and thereafter function as an integral part of the ejected seat.

More specifically, the instant invention proposes auxiliary apparatus which immediately prior to or during the ejection operation of the associated seat may be operatively disengaged from its normal installation and moved out of its normal position in the airplane to function as a unit with the seat to thereby form an aerodynamically stable body to the end that the seat and occupant will not tumble and/or roll after leaving the airplane.

In addition, the seat assembly with the present attachment or auxiliary apparatus protects the occupant during the ejection operation against the pressure of the air passing over and around the airplane. At the same time the ejected seat presents effective aerodynamic lines which permit it to decelerate at a speed within safe limits of endurance of the occupant.

With the above and other objects in view as will be apparent, this invention consists in the construction combination and arrangement of parts all as hereinafter more fully described, claimed and illustrated in the accompanying drawings, wherein:

Fig. 2 is a side elevation of the auxiliary apparatus to show the manner in which it is connected to the ejection seat for operative engagement with the airplane to function as an integral part thereof during normal operation of the airplane;

Fig. 3 is a similar view to show the auxiliary apparatus after its disengagement from the airplane to function as an integral part of the seat during the ejection operation;

Figure 1:
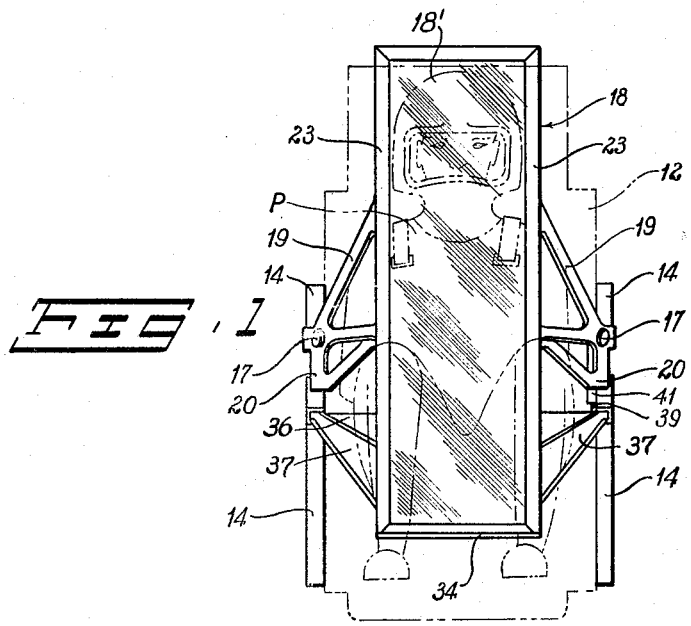
Fig. 1 is a front view of the instant auxiliary apparatus showing it connected to an associated seat and disposed in the emergency position as is the case after it and the seat have been ejected from the airplane, the seat with an occupant therein being shown in phantom lines.

Fig. 6 is an enlarged fragment of the lock means (partly in section) operative between the movable and stationary portions of the auxiliary apparatus for the fixed interconnection thereof during the ejection operation, said means being disposed in the normal or inoperative position corresponding to Fig. 2; and Fig. 7 is a similar view showing the lock means in the operative or ejection position, corresponding to Fig. 3, whereby the auxiliary apparatus forms an immovable or integral part of the ejection seat.

In some present day escape systems for aircraft, particularly military fighter and pursuit type airplanes, it is the practice to eject the occupants or pilots from the airplane (either upwardly or downwardly thereof) together with their individual seats in emergency conditions during flight. In some of the more advanced designs these seats are enclosed within individual containers or capsules. However, the greater number of existing escape systems in service employ the so-called open seat for ejection of the pilot.

Experience has taught designers of escape systems that, regardless of which type of seat is used, i.e., the open or closed seat, maintaining stability of the seat after ejection is a serious problem. Thus, upon ejection the seat with its occupant tends to tumble or roll, i.e., rotate in a vertical plane somersaulting the occupant. Once commenced, this tumbling accelerates to a degree sufficient to seriously injure and even kill the occupant.

Additionally, the degree of danger to the occupant in ejection from the airplane in an open seat is proportional to the speed of the airplane at the time of such ejection. The reason for this is first, the pressure of the air, especially the initial blast, striking the occupant head-on can be sufficient to force his limbs and/or head beyond their normal limits of movement. This air pressure is also capable of crushing the body of the occupant against the seat. Second, the presentation of a relatively large area, such as the front of the occupant and seat, to the airstream upon ejection results in a rapid deceleration in speed of the seat and occupant as compared to that of the airplane. Such deceleration can exceed the limits of human endurance and can prove fatal to the occupant.

The present invention is concerned with the above conditions and proposes to solve the foregoing as well as other problems involved in the ejection of occupants from aircraft in open seats. To this end auxiliary apparatus is proposed which comprises generally a plurality of supporting arms or struts each fixedly secured at one of its ends to the seat and pivotally connected at its other end to structure of the airplane that is immovable or stationary during normal flight. An actuator carried by these struts and connected to the normally stationary structure serves to move and adjust said structure at or prior to the time of ejection to a position generally parallel to and forward of the ejected seat with reference to the direction of flight of the airplane.

Thus, when the ejection operation occurs the occupant of the seat is protected against the airstream by the structure disposed in front of him which acts as a shield or screen. At the same time this screen forward of the seat and occupant presents a flat frontal area which resists any tendency to tumble or roll due to the equal forces of pressure of the airstream acting on and against it. Moreover, the weight or mass of this structure is designed and adapted to shift and locate the center of gravity of the seat and occupant forwardly to thereby aid in rendering the seat aerodynamically stable.

The frontal area of the structure which shields the occupant in the seat during ejection may be, if desired, predetermined to a minimum size to effectively protect the occupant against the air pressure. Since its disposition is forward of the seat, this area of the structure may be accordingly made appreciably smaller than that of the seat per se and occupant. The occupant is thus contained within a relatively low pressure area of air the equivalent for all intents and purposes to a relatively streamlined capsule or closed seat. Therefore, not only does this effective configuration augment stability of the seat, but it also allows for a reduction in the rate of deceleration of the seat after it leaves the airplane for comfort and safety of the occupant.

With reference more particularly to the drawings, 10 designates a fragment of a component of an airplane, such as a nacelle, fuselage, etc., in which a passenger compartment or cockpit 11 is contained. A seat 12 of any standard design mounted for ejection from the airplane is located within the compartment 11 under normal operating conditions of the airplane for the accommodation of a passenger or pilot P. The seat 12 and the means by which it is mounted for ejection as aforesaid per se forms no part of the present invention as any ejection seat may be employed with the present apparatus or stabilizing and protective attachment. The compartment 11 is covered by a closure or canopy 13 which may be totally or partially transparent and may include a movable section 13' for the ingress and egress of the passenger or occupant P. The canopy 13 merges at its edges with the adjacent surface of the component 10 to form an aerodynamically clean continuation thereof.

The foregoing construction is generally representative of many present-day airplanes. The instant invention proposes to adapt this and other comparable constructions to emergency ejection operation during flight under all conditions. A plurality of rigid supporting rods or struts 14 are fixedly secured, as at 15, at corresponding ends to the opposite sides of the seat 12 adjacent the top and bottom thereof. The rods 14 on one side of the seat slope in the direction of each other and adjacent their outer ends are fixedly secured one to another by a web or gusset 16. Each of the upper rods 14 (with reference to the seat 12) terminates in a pivotal connection 17 by which it is fixedly secured to a movable panel or section 18 of the cockpit closure 13 through a triangular mounting bracket 19 carried by and projecting from the panel 18. This panel 18 (Fig. 2) normally forms a stationary part of the airplane and serves as a transparent windshield or part of the windshield at the forward end of the cockpit 11.

The connections 17 on opposed sides of the panel 18 are thus aligned one with the other whereby the panel 18 has a single axis of rotation at the outer ends of the struts 14. Integral with and projecting laterally from one side of each mounting bracket 19 is a supplemental bracket 20. The outer end of each bracket 20 terminates in a lug or boss 21 disposed substantially equidistant from the panel 18 as is the connections 17 and normally in spaced relationship to the outer end of the associated lower strut or rod 14 (Fig. 2). However, when the panel 18 is rotated about the pivotal connections 17 (Fig. 3) the outer edge of each boss 21 is adapted to contact and depress a spring-loaded button or plunger 22 projecting from the end of the associated strut 14.

More specifically and with particular reference to Figs. 6 and 7, the outer end of one strut 14 on each side of the seat 12 is hollow or tubular to accommodate and house a latch 47 mounted for rotation on a shaft 48. The wall of the strut 14 adjacent the shaft 48 is slotted as at 49 to permit the passage of the outer end 47' of the latch 47 therethrough. This outer end 47' of the latch 47 is angularly disposed in the direction of the supplemental bracket 20 to engage a stud 50 projecting laterally therefrom when the panel 18 is disposed in the emergency position.

A spring 51 mounted on the shaft 48 tends to rotate the latch 47 in the direction of the bracket 20, one end of said spring being secured or anchored to the shaft 48 and the other end projecting therefrom to abut the near side of a fixed projection or stop 52 carried by the latch 47. Thus, when the latch 47 is rotated on its shaft 48 away from the bracket 20, the spring 51 is compressed or loaded with a force to instantaneously return the latch 47 to its normal position when free to do so.

In order to maintain the latch 47 in the cocked position, i.e. with the spring 51 under load (Fig. 6), a lateral or radial ear 48' is provided on the shaft 48. A hook 53 pivotally mounted, as at 54, on the inner wall of the strut 14 normally engages and secures the ear 48' against movement, the hook 53 being under the influence of a compression spring 55. To this end a rod 56 is pivotally connected by a pin 57 to the hook 53 medially of its length. Spring 55 is disposed on and around the rod 56 to act against a head or plunger 58 on the outer end of said rod 56 and the adjacent face of a lateral flange or wall 59 projecting integrally from one wall of the strut 14. A hole is provided in the wall 59 for the passage of the rod 56 therethrough.

When the hook 53 thus engages and secures the latch 47 against rotation under the influence of the spring 51, the head or plunger 58 extends beyond the end wall of the strut 14 passing through an aperture provided therein for this purpose. However, upon rotation of the panel 18, in a manner to be explained, the boss 21 on the supplemental bracket 20 strikes the plunger 58. Hook 53 is thereby rotated on its pivot 54 out of engagement with the ear 48' and the latch 47 is allowed to move under the normal action of the spring 51 to receive and engage the stud 50 of the bracket 20 (Fig. 7). The panel is now locked against all further movement in its emergency position.

Figure 5:
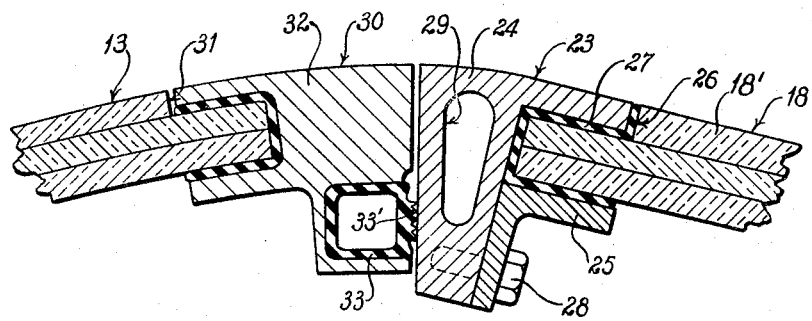
Fig. 5 is a section taken across the joint between the edge of the auxiliary apparatus and the adjoining edge of the stationary structure of the airplane when operatively interengaged during normal operation of the airplane to show the coaction therebetween including sealing means.

The panel 18 carrying the mounting brackets 19 is generally rectangular in shape and comprises a transparent center portion 18' with its marginal edges appropriately mounted in a frame 23. Referring particularly to Fig. 5 the frame 23 of panel 18 may comprise a pair of strips 24 and 25 each angular in section and disposed one within the other with one side of each in flush abutment against the corresponding side of the other and their remaining sides in spaced relation to receive and clampingly engage and secure the marginal edge of the transparent center portion 18'. The outer surface of the center portion 18' adjacent its marginal edges may be grooved or recessed, as at 26, to receive the outer side of strip 24 in flush abutment whereby the external surface of the strip 24 forms a continuation of the corresponding surface of the transparent portion 18' of the panel 18. If desired, a suitable insulating and sealing strip 27 may be interposed between the overlapping and abutting surfaces of frame 23 and panel 18.

When the panel 18 is thus disposed between the spaced sides of the strips or angles 24 and 25 and clamping pressure applied, the abutting sides of the angles 24 and 25 are fixedly secured one to the other by suitable means, such as screws 28. Lightening holes, such as the longitudinal holes 29 may be provided or produced in either or both of the angles 24 and 25 without materially affecting the structural integrity of the assembly.

A similar frame 30 is provided around the edge of the canopy 13 adjacent panel 18 for substantialy abutting coaction therewith. To this end the marginal edge of the canopy is recessed or grooved, as at 31, to be received in the edge of a mounting strip or angle 32. The outer surface of the angle 32 adjacent its canopy receiving edge lies in the plane of the exterior surfaces of the canopy 13 and panel 18 when disposed is in its normal position to thereby form a smooth and aerodynamically clean continuation thereof. Angle 32 is the equivalent for all intents and purposes to the coacting angles 24—25 already described, comprising, however, a single or one-piece element rather than a pair of complementary and coacting elements. The surface of the side of angle 32 facing and substantially abutting angle 24 of the frame 23 is grooved or channelled to receive and contain a seal 33 which projects outwardly thereof to contact and engage the adjoining surface of the angle 24. While any number of conventional seals may be employed for this purpose, it is preferred that the inflatable type having a ribbed or ridged outer surface 33' be used.

In order to permit rotation of the panel 18, when desired, on and about the pivotal connections 17, the portions of the frame 23 forming the transverse edges of the panel 18 as well as the associated edges of the frame 30 are chamferred or beveled, as at 34.

From the foregoing it will now be understood that the panel 18 is so connected to and carried by the seat 12 that it is normally adapted to be disposed forwardly thereof and constitutes in effect an integral part of the cockpit closure 13. At the same time, due to the pivotal connections 17, it is capable of rotation out of its normal position. In order to facilitate such rotation a power actuator 35 is provided. This power actuator 35 is pivotally connected at one of its ends to one of the struts 14 and at its opposite end to one end of the panel 18.

More specifically, the lower and forward end of the panel 18 with reference to the airplane component 10 is provided with a transverse plate 36 integrally or otherwise connected at and along one of its edges to the inner or under surface of the panel to be angularly disposed therefrom in the direction of the seat 12. The plate 36 is further connected to the panel 18 by means of and through a number of webs or gussets 37 connecting the adjacent surfaces of the panel 18 and plate 36. Thus, the outer edge of plate 36 upon rotation of the panel 18 strikes or abuts the edge of the lower struts 14 to limit rotation of the panel on its pivots 17 and to dispose the panel in a predetermined angular position.

Figure 4:
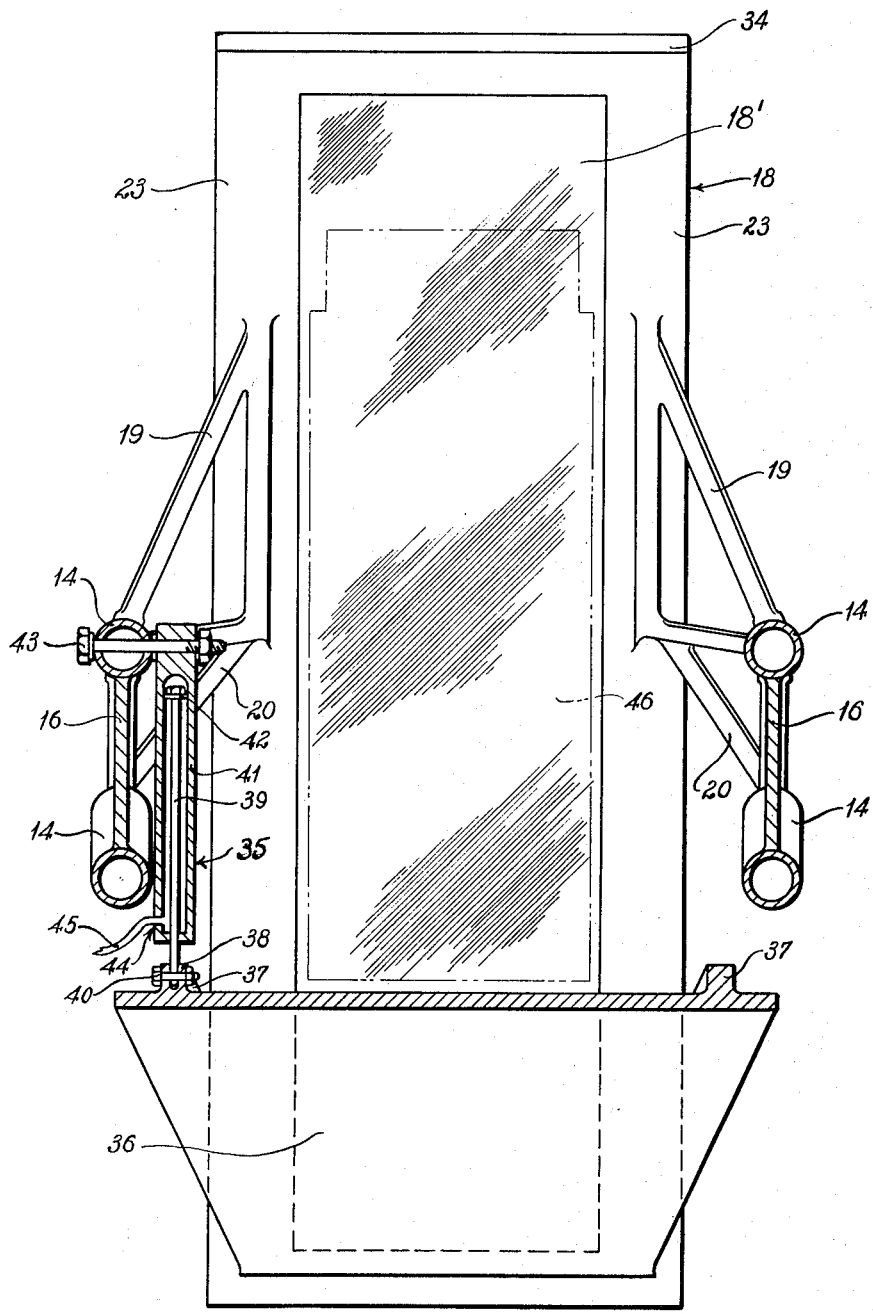
Fig. 4 is a section taken along line 4—4 of Fig. 3 to show among other things an actuating means by which the apparatus is moved from its normal to its emergency position.

The free or extensible end of the power actuator 35 is pivotally connected to the edge of one of the gussets 37 which is bifurcated, as at 38 (Fig. 4) to receive and mount a connecting rod 39 from the power actuator 35 on a pin or bolt 40.

The power actuator 35 comprises a cylinder 41 which is closed by transverse walls at its opposed ends. The cylinder 41 is pivotally connected to the strut 14 by means of a transverse bolt 43 which pierces one of these end walls and the strut. The other end wall of the cylinder 41 is pierced centrally by an aperture to permit the passage therethrough of the rod 39. The cylinder 41 adjacent this end wall is provided with a port 44 to which a pipe or fluid line 45 is connected for the delivery of fluid, air or gas under pressure, from a remote source (not shown) to the interior of the cylinder.

At its inner end to be disposed within the cylinder 41 the connecting rod 39 carries a piston 42 fixedly connected thereto. When fluid is made available to the port 44 it enters the cylinder 41 for operation on and against one side of the piston 42 for movement thereof to telescope or shrink the power actuator 35. The panel 18 is thereby rotated about its pivot on the connections 17 to bring the outer edge of the plate 36 into contact with the struts 14. When the panel is thus moved it is disposed and maintained by the operation of the latches 47 hereinabove described in a position substantially parallel to the seat 12.

Prior to the above emergency operation, however, no fluid is made available to the cylinder 41, and the piston rod 39 is allowed to extend from the cylinder 41. The means by which fluid is made available to the cylinder 41, as well as the source of such fluid, is unimportant and constitutes no part of the invention herein. An existing fluid source within the airplane may be employed for this purpose or a separate individual unit may be incorporated at any convenient location within the airplane. In either case, conventional valve means operable by the pilot or passenger P makes the fluid available to the cylinder 41. The length of the rod 39 is such that when thus extended it disposes the panel 18 in its normal position, i.e. in substantial abutment against the adjacent edges of the canopy 13. If desired additional lock means such as, for example, a latch and stud arrangement like latch 47 and stud 50 may be employed to secure the panel 18 in this position. In this case either the latch or stud is carried by fixed or stationary structure of the airplane, while the other coacting element of the lock is carried by the panel 18.

So far as the present invention is concerned, under normal operating conditions the cylinder 41 is devoid of operating fluid and the rod 39 is in the fully extended position. Under emergency or ejection conditions fluid is delivered to the cylinder 31 through fluid line 45 to thereby retract the rod 39 and concurrently rotate the panel to a position substantially parallel to the back of the seat (Fig. 3). At this time the latch 47 engages the stud 50 and locks the panel in the parallel position aforesaid. Operation of the cylinder 41 is thereafter ineffective or unnecessary so that upon subsequent ejection of the seat 12 from the airplane the fluid line 45 merely breaks or otherwise separates without consequence.

With particular reference to Fig. 3 showing the present apparatus in the emergency position, the movable section 13' of the cockpit closure 13 having been first removed by any means, it is seen that the protective screen or panel 18 together with the seat 12 and connecting arms or struts 14 outline a generally box- or bluff-shape. The axis of rotation or pivotal connections 17 of the panel 18 on and about the struts 14 is located substantially midway in the length of the panel 18. Hence, the pressure of air striking the face of the panel 18 is equally distributed thereover with reference to its axis or pivot 17 to thereby maintain the panel in the emergency position substantially parallel to the seat 12. The seat 12 and occupant P, therefore, are maintained in a relatively stable condition and the tendency to roll and/or tumble is counteracted.

In order to augment this stability of the ejected seat 12 and auxiliary apparatus, the panel 18 or struts 14 may be weighted by equipment or paraphernalia of the airplane. For example, a gun sight or instrument panel 46 normally mounted within the cockpit or compartment 11 may be fixedly secured by suitable means to the bracket 19. Disconnection of the sight or panel 46 from associated equipment or mechanisms permanently carried by the airplane and to which the panel 46 is operatively connected during normal flight may be effected by any conventional and well-known quick-releasable connector. Such connector, per se forms no part of this invention.

The effect of thus weighting the panel 18, however, is to locate specifically the center of gravity of the ejected seat 12 and auxiliary apparatus to meet the particular conditions of a given escape system. Hence, the center of gravity of the ejected assembly may be located at a precise point to compliment the bluff-shape and effect maximum stability. This location, of course, will vary with each particular assembly.

Referring to Fig. 1 panel 18 has been illustrated in a form to present substantially minimum frontal area to the end that the rate of deceleration of the assembly after ejection will be reduced to more closely proximate that of the airplane. It is to be understood that the relative effective area of such panel 18 will vary to meet the particular conditions involved in each application depending largely upon the speed of the aircraft at the time of ejection and other flight factors.

It is to be further understood that this invention is directed to the auxiliary apparatus per se, i.e., the panel 18 and struts 14, including the actuating mechanism therefor. The only structure of the airplane that constitutes any part of the invention is the structure adjacent the panel 18 which necessarily must be modified to accommodate and coact with the panel in its normal or inoperative position. The aircraft component 10, including cabin 11 and closure 13, seat 12 and equipment 46, all illustrated in phantom broken lines in the drawings, form no part of the invention and have been shown and described in order to present a clear understanding of the invention and its application. Thus, the auxiliary apparatus which forms the subject matter of this invention is adapted to be connected to and carried by any existing ejection seat.

By way of summary, when the pilot or passenger P in the seat 12 decides to eject himself from the airplane, as in an emergency, the removable portion or section 13' of the canopy closure 13 is removed from the airplane by any suitable means. Thereafter, the auxiliary locks, if employed to secure the panel 18 in its normal position forming a fixed and stationary part of the windshield, are released and the actuator 35 is activated to rotate the panel 18 out of its normal position to a position substantially parallel to the back of the seat 12. When the panel 18 has been moved to such position, the lock or latch 47 engages and secures it in such position, and upon actuation of the catapult or other means associated with the seat 12 for its ejection from the airplane, the pilot, seat, and auxiliary apparatus is jettisoned as a unit from the airplane.

What is claimed is:

1. The combination with an airplane having a passenger compartment, a stationary windshield at the forward end of said compartment, a removable canopy enclosing said compartment and an ejection seat including a backrest mounted within the compartment, of a movable panel normally forming a section of said windshield, a plurality of struts each fixedly secured at one end to the seat and pivotally connected at the other end to said panel, a power actuator connected to at least one of said struts and to the panel for the rotation of said panel relative to said struts out of its normal position, and means carried by the struts and disposed in the path of rotation of the panel to engage and secure said panel in a position substantially parallel to the backrest of the seat.

2. The combination with an airplane having a passenger compartment, a windshield at the forward end of said compartment, a removable canopy enclosing said compartment and an ejection seat including a backrest mounted within the compartment, of a panel normally forming a fixed section of said windshield, a plurality of struts each fixedly secured at one end to one side of the seat and pivotally connected at the other end to the corresponding side of said panel, and a power actuator connected to one of said struts and to the panel for the rotation of said panel relative to said struts out of its normal position to a position substantially parallel to the backrest of the seat.

3. The combination with an airplane having a passenger compartment, a seat mounted in said compartment for ejection from the compartment and a closure adapted to cover said compartment, of an individual panel normally forming a stationary section of said closure, fixed length means connecting said panel to said seat in spaced relation for movement relative thereto, and a power actuator connected between said seat and said panel for the movement of the panel out of its normal position to a position substantially parallel to, spaced from and forward of the seat at ejection.

4. The combination with an airplane having a passenger compartment, a stationary transparent windshield at the forward end of said compartment and an ejection seat mounted within said compartment, of a movable transparent panel normally forming a section of said windshield, said panel being mounted at its edges in a frame for coaction with a frame mounted on and carried by the adjacent edge of the windshield to thereby form an aerodynamically clean continuation thereof externally of the compartment, sealing means between said coacting frames, struts fixedly secured to the seat and pivotally connected at their outer ends to opposite sides of the panel, and means connecting the panel and struts and operable to rotate the panel out of its normal position and dispose it substantially parallel to the seat.

5. The combination with an airplane having a passenger compartment, a removable closure normally overlying and covering said compartment and a seat mounted in said compartment for ejection from the compartment upon removal of the closure aforesaid, of a panel forming a section of the closure when said closure is disposed in its normal position aforesaid, said panel substantially conforming in size and shape to the frontal area of the seat, means connecting said panel to the seat for movement relative thereto, and a power cylinder operatively connected between the seat and panel for movement of the latter out of its normal position to a position substantially parallel to, forward of and in alignment with the seat when the seat is to be ejected.

6. The combination with an airplane having a passenger compartment, a removable closure normally overlying and covering said compartment and a seat mounted in said compartment for ejection from the airplane when the closure is removed, of a panel normally forming a section of said closure, said panel substantially conforming in size and area to the frontal area of the seat, a plurality of arms each fixedly connected to the seat and extending forwardly thereof, a pivotal connection at the outer ends of said arms for engagement with the panel substantially at the center thereof, and a power actuator connected between said arms and the panel for movement of the panel out of its normal position to a position substantially parallel to and forward of the seat when ejected.

7. The combination with an airplane having a passenger compartment, a closure normally overlying and covering said compartment and a passanger seat mounted in said compartment for the ejection of the seat with its occupant from the airplane, of a panel normally forming a section of said closure, said panel substantially conforming in size and area to the frontal area of the occupant in the seat, struts fixedly secured to opposite sides of the seat and extending forwardly thereof, the struts on each side of the seat converging at their outer ends and connected one to the other, a pivotal connection carried by said struts at their outer ends for engagement with the panel substantially medially of its ends, a power actuator operative between said struts and the panel for rotation of the panel on and about said connection out of its normal position, and arresting means carried by the panel for engagement with the struts to limit rotation of the panel and thereby dispose said panel in a position substantially parallel to and forward of the seat.

8. The combination with an airplane having a cockpit, an aerodynamically clean closure normally overlying and enclosing said cockpit and a pilot's seat mounted in the cockpit for ejection from the airplane, of a panel normally forming a section of said closure generally forward of the seat, said panel conforming in shape and area to the general frontal shape and area of the seat, a primary bracket carried by and extending from the side of the panel facing the seat, a supplemental bracket carried by said bracket aforesaid and projecting angularly therefrom, struts fixedly secured to opposite sides of the seat and extending toward the panel, means immovably connecting the outer ends of said struts on the same side of the seat one to the other, a pivotal connection between the primary bracket and the outer ends of the struts, a normally inoperative lock between the supplemental bracket and the outer ends of the struts, and a power actuator between the struts and the panel for sequentially rotating the panel on and about the pivotal connection and operating said lock whereby the panel is displaced out of its normal position into a fixed position substantially parallel to the seat.

9. The combination with an airplane having a cockpit, a closure normally overlying and enclosing said cockpit and a pilot's seat mounted in the cockpit for ejection from the cockpit, of a panel normally forming a stationary part of said closure generally forward of the seat, a mounting bracket carried by and projecting substantially at right angles from the side of the panel facing the seat, a supplemental bracket carried by said mounting bracket and projecting angularly therefrom, struts fixedly secured to opposite sides of the seat and extending toward the panel, a pivotal connection between the outer ends of the mounting bracket and struts, a power actuator operative between the struts and the panel to swing the panel on and about the pivotal connection relative to the seat, a latch mechanism carried by at least one of said struts adjacent the outer end thereof and disposed in the path of movement of the outer end of the supplemental bracket when the panel swings as aforesaid whereby contact of said mechanism by said supplemental bracket actuates the mechanism, and complemental means on said supplemental bracket adjacent the outer end thereof to engage and secure the latch mechanism when so actuated to thereby lock the panel in a position substantially parallel to the seat.

10. The combination with an airplane having a passenger compartment, a closure normally overlying and enclosing said compartment and a seat mounted in the compartment for ejection from said compartment, of a panel normally forming a stationary part of the closure generally forward of the seat, a bracket carried by and extending from the side of the panel facing the seat, struts carried by and projecting from the seat toward the panel, pivot means connecting the bracket to the outer ends of the struts, a power actuator connecting and operable between the struts and the panel whereby the panel is swung relative to the struts out of its normal position to a position substantially parallel to the seat, and a lock having coacting elements carried by the struts and the panel respectively for engagement when the panel occupies the position parallel to the seat as aforesaid whereby said panel is fixedly secured in said parallel position.

11. The combination with an airplane having a passenger compartment, a closure normally overlying and enclosing said compartment and a seat mounted in the compartment for ejection from said compartment of a panel normally forming a stationary part of the closure generally forward of the seat, a bracket carried by and projecting substantially at right angles from the side of the panel facing the seat, a boss on the outer end of said bracket, a pivotal connection between the seat and the bracket whereby the panel may be swung out of its normal position aforesaid to a position substantially parallel to the seat, a spring-loaded latch connected to the seat and operative to engage and secure the panel in position parallel to the seat when free to act, and a plunger normally engaging and thereby restraining said latch against operation disposed in the path of rotation of the boss when the panel swings as aforesaid whereby contact of the boss with said plunger releases the spring-loaded latch for operation.

12. The combination with an airplane having a passenger compartment, a closure normally overlying and enclosing said compartment and a seat mounted in the compartment for ejection from the compartment and airplane, of a panel normally forming a stationary part of the closure forward of the seat, a bracket carried by and projecting from the side of the panel facing the seat, a supplemental bracket carried by and projecting angularly from said first bracket, a lug on the outer end of said supplemental bracket, a pivotal connection between the seat and first bracket, a power actuator connected between the seat and panel and operative to swing the latter on said connection out of its normal position to a position substantially parallel to the seat, a spring-loaded latch connected to structure carried by the seat and operative when free to act to engage and secure the supplemental bracket when the panel is disposed in position parallel to the seat, and a spring-loaded plunger normally engaging and securing the latch against operation and disposed in the path of rotation of the lug when the panel swings as aforesaid whereby contact of the lug with said plunger releases the spring-loaded latch for operation.

13. The combination with an airplane having a cockpit, a removable closure normally overlying and enclosing said cockpit and a pilot's seat mounted in the cockpit for ejection of the seat with pilot therein from the cockpit and airplane, of a panel normally forming a stationary part of said closure forward of the seat, a mounting bracket carried by and projecting substantially at right angles from the side of the panel facing the seat, a supplemental bracket carried by said mounting bracket and projecting angularly therefrom, struts fixedly secured to opposite sides of the seat and extending toward the panel, a pivotal connection between the outer ends of the mounting bracket and struts, a power actuator connecting and operative between the struts and the panel to swing the panel on and about the pivotal connection, a projection carried by the panel and disposed in the plane of the struts for contact with said struts when the panel swings as aforesaid whereby said panel is arrested in so moving in a position substantially parallel to the seat, a stud projecting from the supplemental bracket on at least one side of the panel, a spring-loaded latch carried by one of the struts on the corresponding side of the seat operative to engage and secure said stud when the panel is disposed in the parallel position aforesaid an overpowering spring-loaded plunger normally engaging and thereby restraining the spring-loaded latch against operation, and a boss carried by the supplemental bracket and projecting therefrom to be disposed in the plane of said plunger whereby said boss strikes the plunger upon swinging of the panel to the substantially parallel position aforesaid and thereby releases said plunger for actuation of the spring-loaded latch.

14. The combination with an airplane having a passenger compartment, an ejection seat mounted in said compartment and a removable closure partially covering said compartment, of an individual movable panel normally disposed over the uncovered portion of the compartment with the edges thereof in alignment with and substantial abutment against adjacent edges of the closure to thereby form an uninterrupted continuation of said closure, a connector between the seat and the panel, and an actuator between the seat and panel operative on said panel to move it out of its normal position aforesaid to a position substantially parallel to and forward of the seat whereby it shields the occupant of the seat against the airstream when ejected from the airplane during flight.

15. The combination with an airplane having a passenger compartment, a closure comprising a stationary section and a removable section covering said compartment and a seat mounted in said compartment for ejection from the airplane upon the removal of the latter section aforesaid, of a panel normally forming a part of said stationary portion of said closure, a pivotal connection between said panel and said seat, and a power actuator connected between the panel and the seat and operable for movement of said panel relative to the seat about said pivotal connection out of its normal position to a position substantially parallel to, spaced from and forward of the seat when the seat is to be ejected.

16. The combination with an airplane having a passenger compartment, a windshield adjacent the forward end of said compartment, equipment within said compartment connected to the windshield, a removable closure covering said compartment and a passenger seat mounted in said compartment aft of the windshield for ejection from the airplane upon the removal of the closure aforesaid, of a movable panel normally forming a part of the windshield and carrying the equipment aforesaid, a pivotal connection between the panel and the seat, and a power cylinder connected between the seat and the panel whereby said panel and equipment rotate as a unit on the pivotal connection to a substantially parallel position relative to said seat when the seat is to be ejected, the weight of the equipment serving to dispose the center of gravity of the seat and panel at a preselected location upon ejection.

17. The combination with an airplane having a passenger compartment, a seat mounted in said compartment for ejection from the compartment and airplane and a normally stationary windshield adjacent the forward end of said compartment, of a pivotal connector carried by fixed-length rigid extensions projecting forwardly from the seat and connected to the windshield, and an actuator connected between the windshield and said extensions and operative to move said windshield out of its normal position aforesaid to a position substantially parallel to, spaced from and forward of the seat when the seat is ejected.

18. The combination with an airplane having a passenger compartment, a seat mounted in said compartment for ejection therefrom and a transparent closure adapted to cover said compartment, of a weighted panel normally forming a fixed section of said closure, a plurality of struts each fixedly secured at one end to the seat and at the other end pivotally connected to the panel, and a power actuator connected and operative between said struts and the panel for the rotation thereof out of its normal position aforesaid to a position substantially parallel to and forward of the seat at ejection.

References Cited in the file of this patent

UNITED STATES PATENTS

| 2,699,305 | Turner et al. | Jan. 11, 1955 |
| 2,829,850 | Culver | Apr. 8, 1958 |